US009667509B1

(12) United States Patent
Levi et al.

(10) Patent No.: US 9,667,509 B1
(45) Date of Patent: May 30, 2017

(54) SYSTEM, METHOD, AND COMPUTER PROGRAM FOR SECLUDING A SERVICE IN A NETWORK BASED ON NETWORK FUNCTION VIRTUALIZATION (NFV)

(71) Applicant: Amdocs Software Systems Limited, Dublin (IE)

(72) Inventors: Guy Levi, Raanana (IL); Nimrod Sandlerman, Ramat-Gan (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 166 days.

(21) Appl. No.: 14/605,856

(22) Filed: Jan. 26, 2015

(51) Int. Cl.
G06F 15/173 (2006.01)
H04L 12/24 (2006.01)
H04L 12/927 (2013.01)

(52) U.S. Cl.
CPC ...... H04L 41/5041 (2013.01); H04L 41/5035 (2013.01); H04L 47/80 (2013.01)

(58) Field of Classification Search
CPC . H04L 12/4683; H04L 41/0813; H04L 43/08; H04L 63/1416; H04L 67/02
See application file for complete search history.

(56) References Cited

U.S. PATENT DOCUMENTS

2015/0288541 A1* 10/2015 Fargano .............. H04L 41/0813
709/225
2016/0205004 A1* 7/2016 Chou ..................... H04L 43/08
709/224

OTHER PUBLICATIONS

Felstaine et al., U.S. Appl. No. 62/027,709, filed Jul. 22, 2014.
Felstaine et al., U.S. Appl. No. 14/572,729, filed Dec. 16, 2014.

* cited by examiner

*Primary Examiner* — Kim T Nguyen
(74) *Attorney, Agent, or Firm* — Zilka-Kotab, PC

(57) ABSTRACT

A system, method, and computer program product are provided for limiting an impact of at least one internal network entity on a network function virtualization (NFV) based communication network hosting the network entity, the method including: providing a container including at least one borderline gateway, providing within the container at least one of internal network entity, where the internal network entity includes a software module, a virtual network function (VNF), and a VNF instance, and assigning the borderline gateway at least one protective limit, where NFV-based network includes at least one external network entity, the external network entity is external to the container, where the at least one internal network entity communicates with any of the external network entities only via the at least one borderline gateway, and where the borderline gateway is operative to use the protective limit to limit the impact on the NFV-based network.

20 Claims, 15 Drawing Sheets

86

SYSTEM, METHOD, AND COMPUTER PROGRAM FOR SECLUDING A SERVICE IN A NETWORK BASED ON NETWORK FUNCTION VIRTUALIZATION (NFV)

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The NFV-based network is managed by a software program including an NFV orchestration (NFV-O) component. Typically, the NFV-O is responsible for installing, activating, and deactivating VNFs and VNF instances, as well as other functions of the NFV-based network. If two NFV-based networks should be connected, their respective NFV-Os should coordinate their functionality and activities. An NFV-O therefore manages in a typical processing unit a plurality of VNFs of various services provided by different VNF vendors. The NFV-O should ensure that no VNF may in any manner adversely affect the operation or security of any other VNF. There is thus a need for addressing these and/or other issues associated with the prior art.

SUMMARY

According to one embodiment there is provided a system, method, and computer program product for limiting an impact of at least one internal network entity, on a communication network hosting the network entity, the communication network using network function virtualization (NFV-based communication network), the method including: providing a container including at least one borderline gateway, providing within the container at least one of internal network entity, where the internal network entity includes a software module, a virtual network function (VNF), and a VNF instance, and assigning the borderline gateway at least one protective limit, where NFV-based network includes at least one external network entity, the external network entity is external to the container, where the at least one internal network entity communicates with any of the external network entities only via the at least one borderline gateway, and where the borderline gateway is operative to use the protective limit to limit the impact on the NFV-based network.

DETAILED DESCRIPTION

Figure 1:
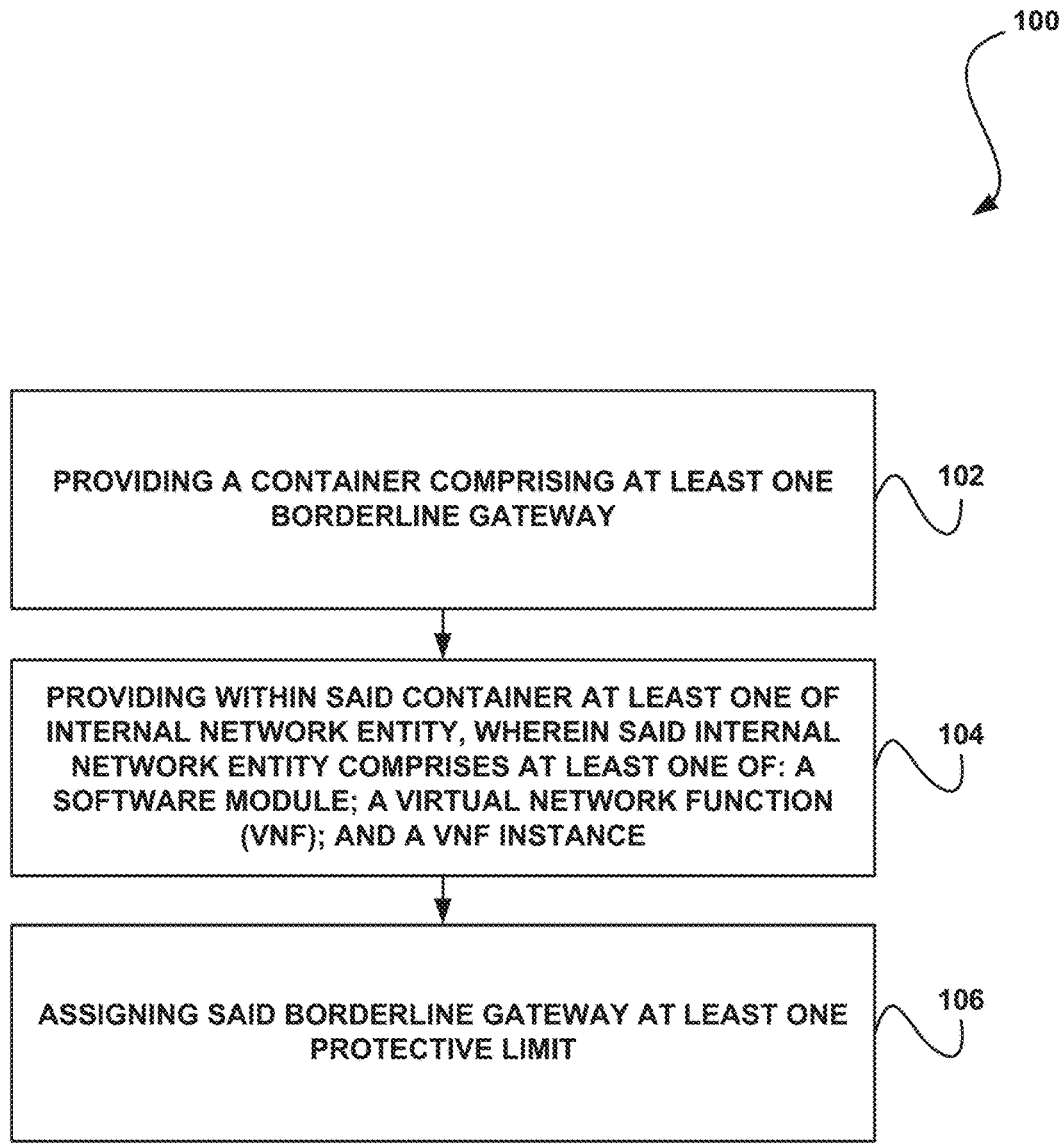
FIG. 1 illustrates a method for secluding a service in a network based on network function virtualization (NFV), in accordance with one embodiment.

FIG. 1 illustrates a method 100 for secluding a service in a network based on network function virtualization (NFV), in accordance with one embodiment.

The method 100 is operative for limiting an impact of at least one internal network entity on a communication network hosting the network entity, the communication network using network function virtualization (i.e. the network is a NFV-based communication network). As shown, a container is provided including at least one borderline gateway. See operation 102. Within the container is provided at least one of an internal network entity. See operation 104. The internal network entity includes at least one of a software module, a virtual network function (VNF), and a VNF instance.

Further, the borderline gateway is assigned at least one protective limit. See operation 106. The NFV-based network includes at least one external network entity, and the external network entity is external to the container. In addition, the at least one internal network entity communicates with any of the external network entities only via the at least one borderline gateway. Additionally the borderline gateway is operative to use the protective limit to limit the impact on the NFV-based network.

The impact on the NFV-based network may include a variety of impacts. For example, the impact on the NFV-based network may include one or more of: an impact on a direct external network entity, where the direct external network entity is operative to process at least one command provided by the at least one internal network entity; an impact on an external resource of the NFV-based network, where the external resource is external to the container; an impact on an indirect external network entity, where the indirect external network entity shares a resource with at least one direct external network entity; and an impact on an internal network entity associated with a communication received by the borderline gateway from an external network entity.

As another example, the impact on the NFV-based network may include one or more of: a load on a resource of NFV-based communication network, where the resource is not part of the container; and a consumption of a resource of the NFV-based communication network, where the resource is not part of the container.

As another example, the impact on the NFV-based network may include one or more of an impact on a processing load, memory consumption, storage consumption, bandwidth consumption, communication repetition, increased latency, increased jitter, and/or energy consumption, etc.

Moreover, the borderline gateway may include various entities, such as an application programming interface (API), a virtual network function (VNF), a VNF instance, and/or a borderline network interface.

Still yet, in one embodiment, the method 100 may further include changing the protective limit automatically, in real-time, according to at least one of load and consumption produced by at least one external network entity. In another embodiment, the method 100 may include enabling a user to define at least one rule for calculating a value of the impact, and using the rule, by the borderline gateway, automatically, in real-time, to calculate the value of a possible impact of a current communication received by the borderline gateway.

In another embodiment, the method 100 may include enabling a user to define at least one rule for determining a protection event, and using the rule, by the borderline gateway, automatically, in real-time, to determine a protection event associated with a current communication received by the borderline gateway. In another embodiment, the method 100 may include enabling a user to define at least one rule for handling a protection event, and using the rule, by the borderline gateway, automatically, in real-time, to limit the impact.

Further, in one embodiment, the method 100 may include one or more of rejecting the communication, reporting the rejection to the network responsible to the impact, reporting the protection event to an NFV-O, and/or reporting the handling of the protection event to an NFV-O.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breach or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breach or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for secluding a service in an NFV-based network according to various embodiments may be further understood with reference to the following drawings and accompanying description.

Figure 2:
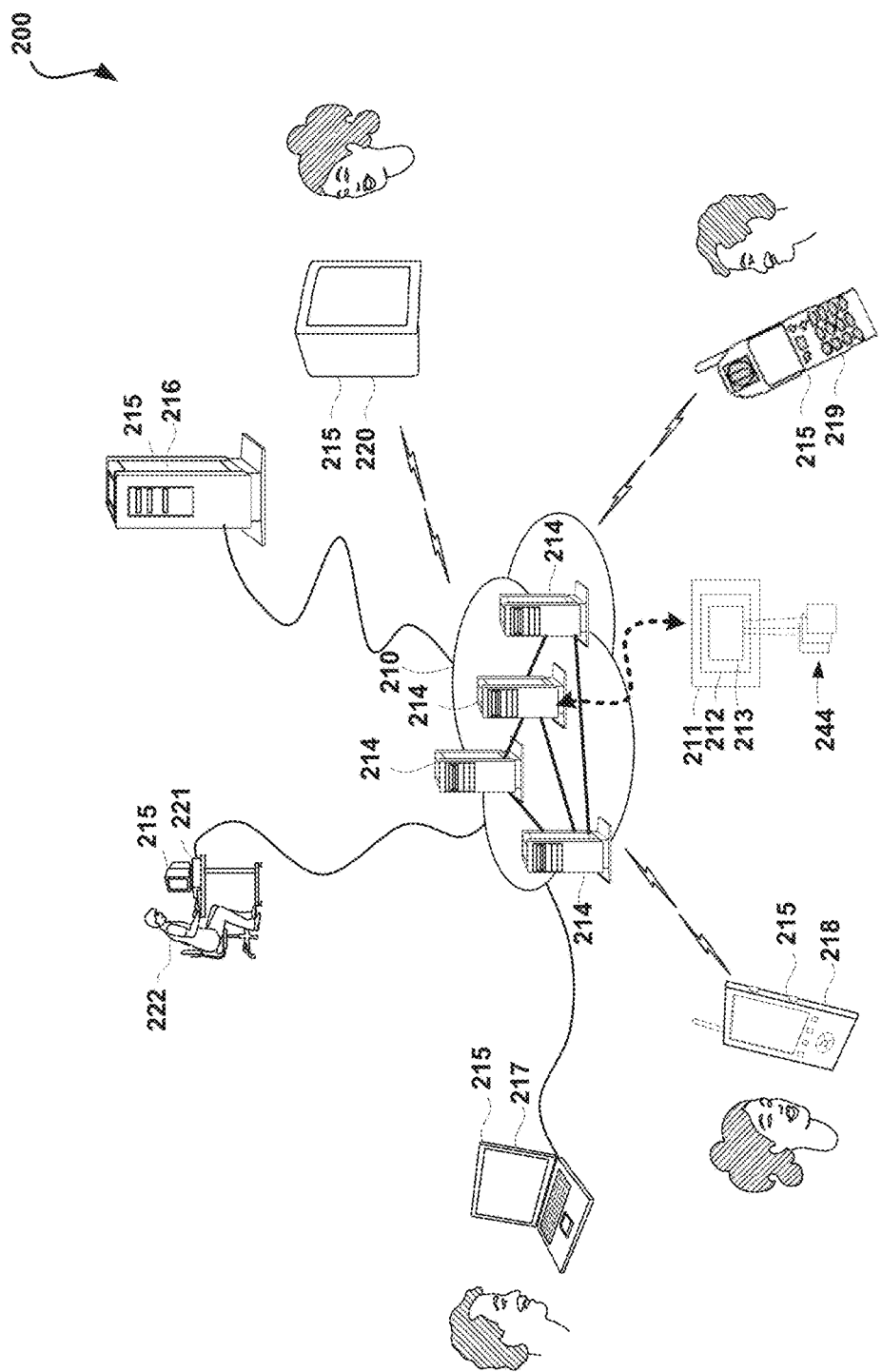
FIG. 2 is a simplified illustration of an NFV-based communication network including an NFV management system, an NFV-orchestration (NFV-O) module, a container management module, and a container, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, a container management module 213, and at least one container 244, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the container management module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The container management module 213 may be a part or a component of the NFV-O module 212. However, the container management module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the container management module 213.

Container management module 213 typically manages one or more containers 244 within the NFV-based network 210.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the container management module 213.

Figure 3:
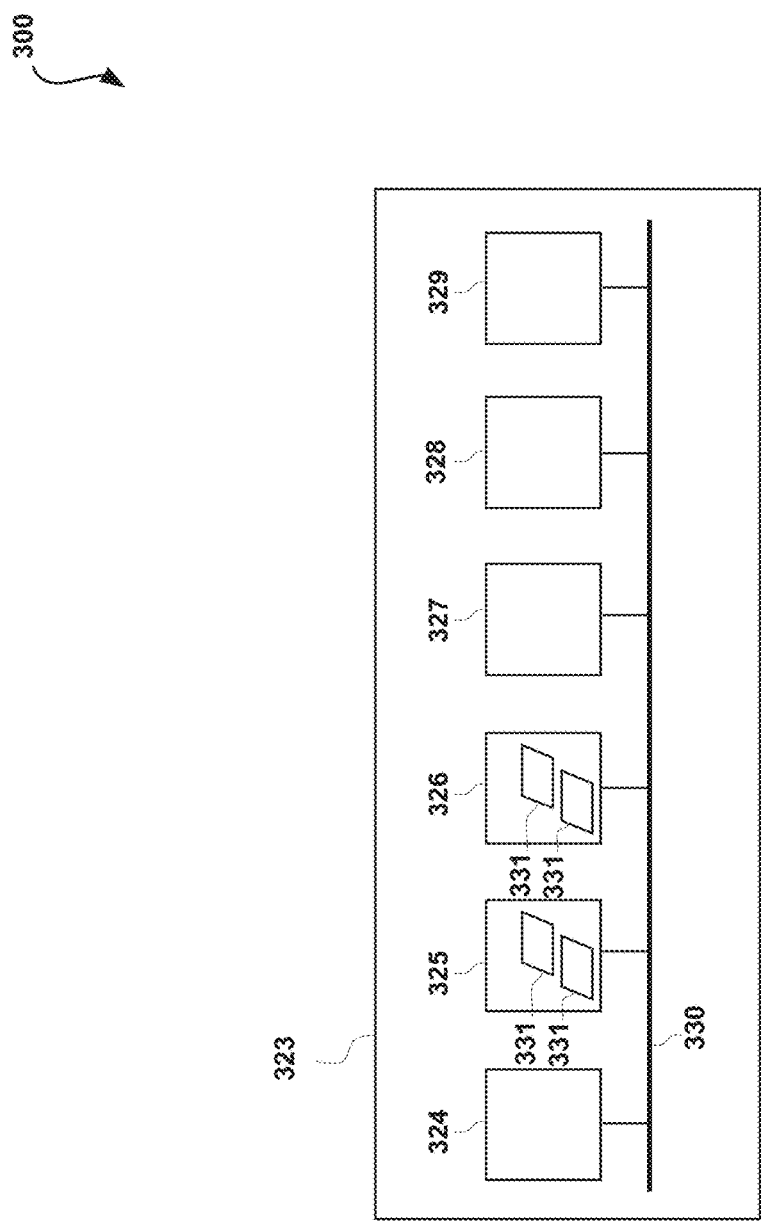
FIG. 3 is a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the container management module 213 of FIG. 2.

Figure 4:
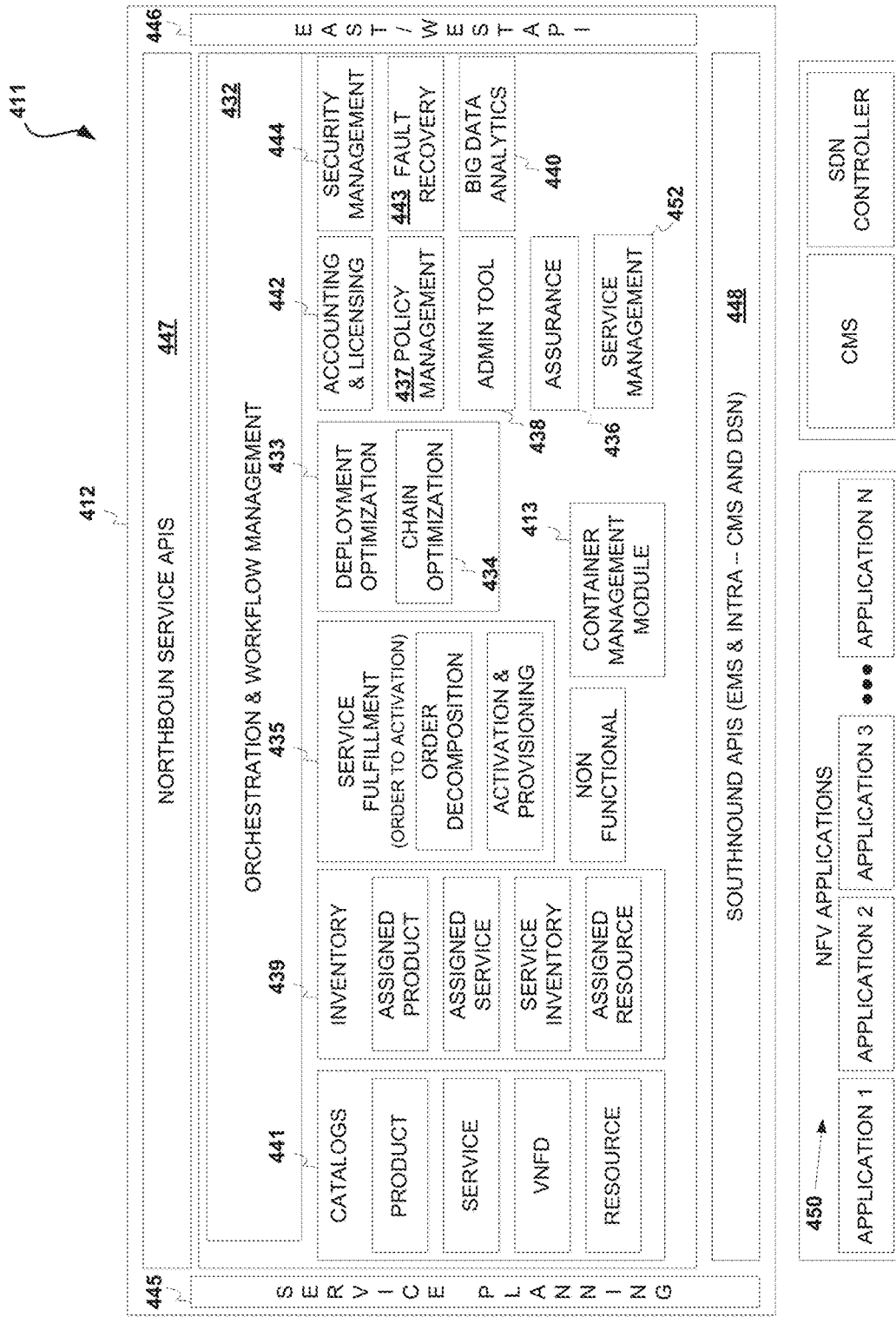
FIG. 4 is a simplified block diagram of NFV-infrastructure including network function virtualization orchestration layer (NFV-O), and container management module, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a container management module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfilment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related life-cycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The container management module 413 may also be part of the NFV-O module 412.

The container management module 413 manages one or more containers. A container may include one or more VNFs and one or more VNF instances. The container excludes or isolates the VNFs and VNF instances from the rest of the NFV-based network so that the VNFs and VNF instances included in the container have a limited effect on other elements, components, or modules of the NFV-based network. The limitations imposed by the container on the VNFs and VNF instances it includes may be set by an administrator using container management module.

Additionally or alternatively, the container excludes or isolates the VNFs and VNF instances from the rest of the NFV-based network so that the VNFs and VNF instances included in the container have a limited effect by or from other elements, components, or modules of the NFV-based network. The limitations imposed by the container on the network elements, components, or modules external to container may be set by administrator using container management module.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfilment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
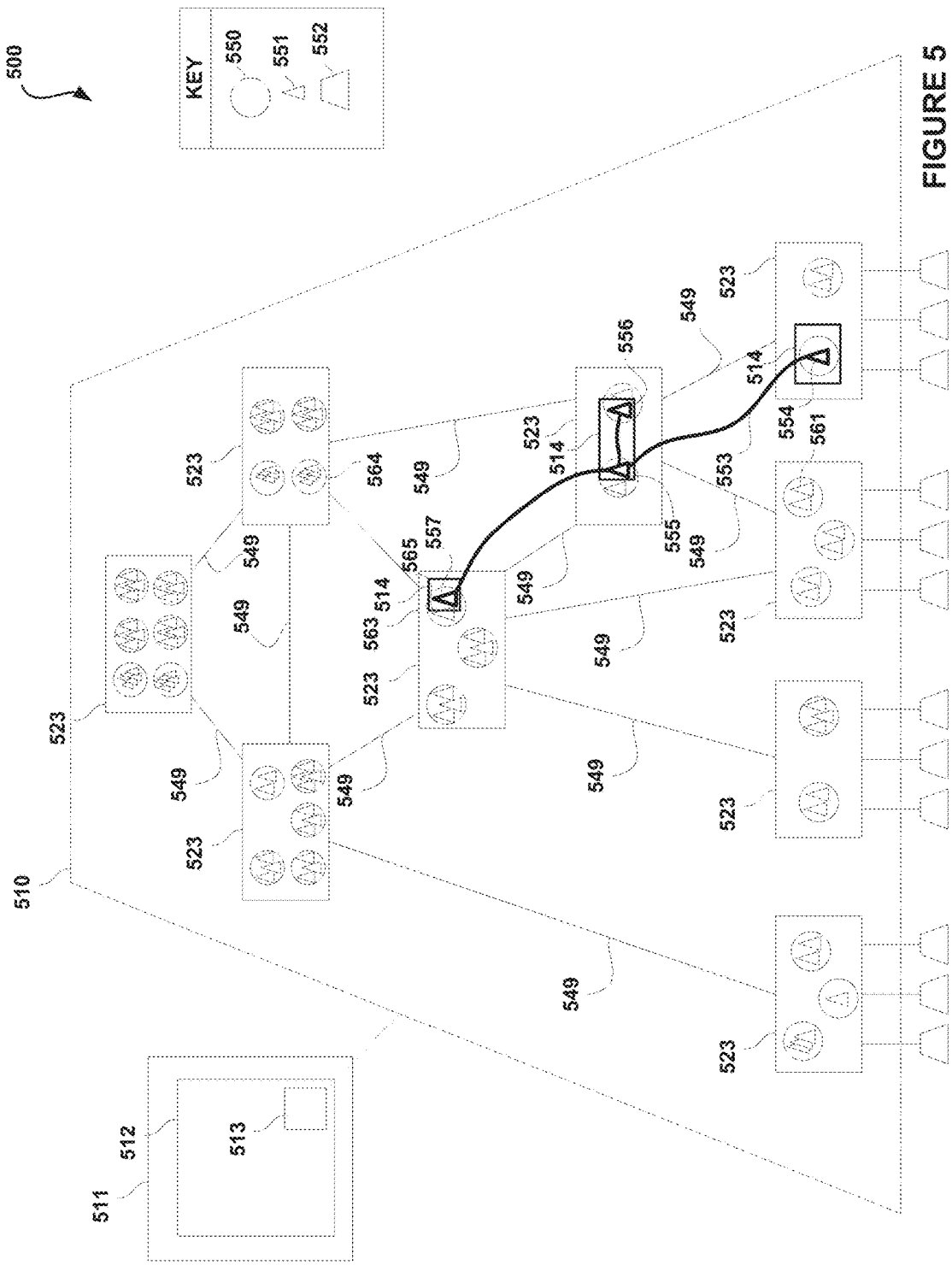
FIG. 5 is a simplified block diagram of deployment of an NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a container management module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

As shown in FIG. 5, VNF instance 554 is placed within a first container 514, VNF instances 555 and 556 are placed within a second container 514, and VNF instance 557 is placed within a third container 514.

A container may include any number of VNFs, and any number of VNF instances. A VNF may be instantiated as a VNF instance within a container and also, at the same time, as a VNF instance outside a container. A service may be contained in a single container, or within a plurality of containers, forming a super-container.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
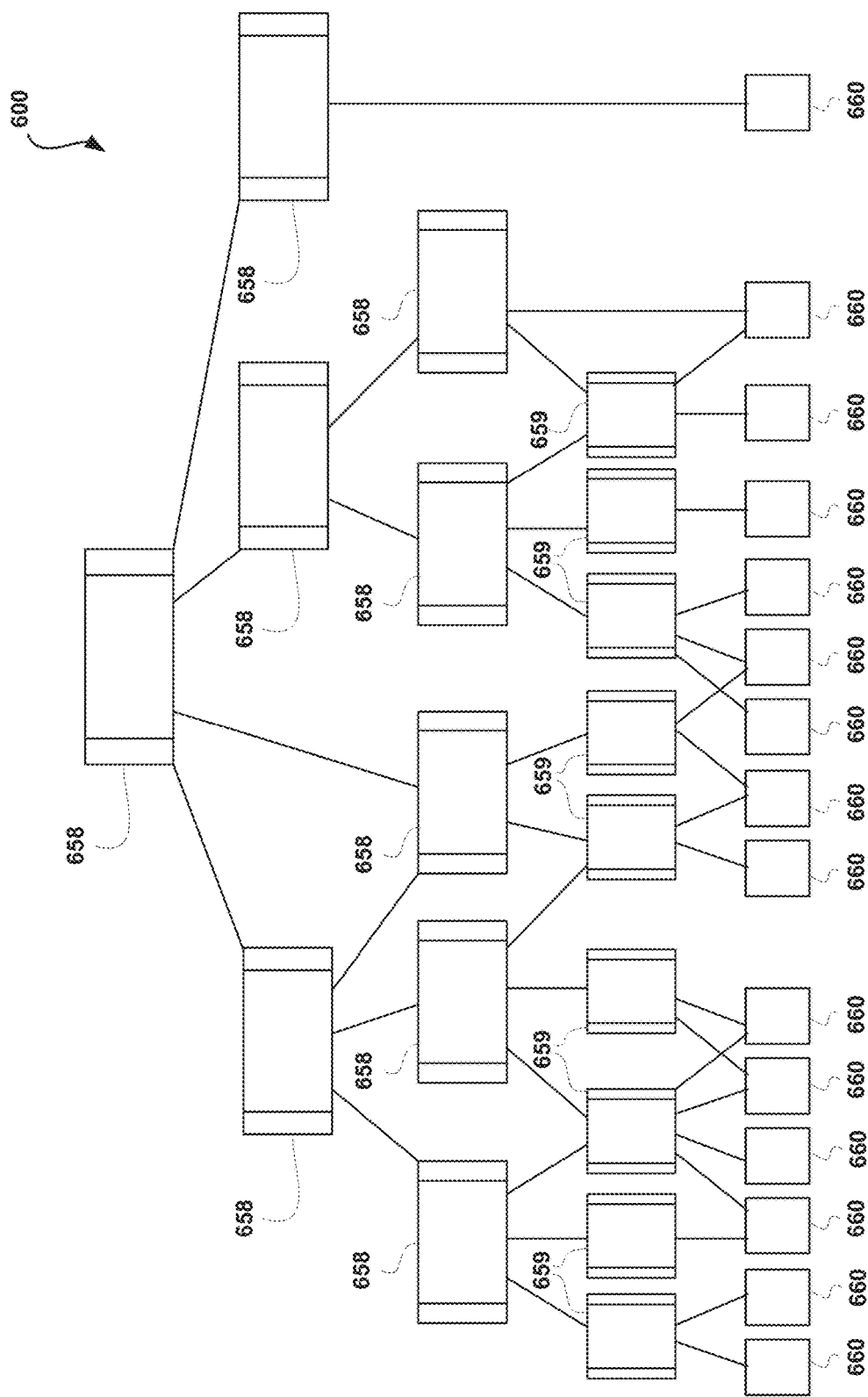
FIG. 6 is a simplified block diagram of a distributed deployment of NFV-O, in accordance with one embodiment.

FIG. 6 illustrates a simplified diagram 600 of a distributed deployment of an NFV-O, in accordance with one embodiment. As an option, the diagram 600 may be viewed in the context of the details of the previous Figures. For example, in one embodiment, the distributed deployment of the NFV-O may represent the NFV-based networks and associated elements described in the context of the previous Figures. Of course, however, the diagram 600 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 658 and a leaf component 659. The NFV-O core component 658 can be a child of another core component 658, and/or a parent of one or more core components 658 or leaf components 659. A leaf component 659 cannot be a parent of a core component 658 or a leaf component 659.

Orchestration parameters managed by a particular leaf component 659 or core component 658 may be reported in real-time to the supervising (parent) core component 658. In addition to the supervision, this continuous updating process enables the supervising component to provide backup, and/or support recovery processes associated with hardware and/or software faults as well as security faults and/or breeches.

To provide redundancy, a leaf component 659 may be supervised by two or more core components 658, and child core components 658 may be supervised by two or more parent core components 658. The orchestration parameters managed by a particular core component 658 or leaf component 659 may also be mirrored to the backup core components 658. Optionally, the NFV-O core components 658 may have the same fully functional orchestration capabilities, while leaf components may be limited to simple, well defined and localized sub-orchestration tasks, and thus may provide a faster response to demands and changing load.

A cloud management system (CMS) 660 is a software package managing one or more hardware units operating one or more VNFs and executing one or more VNF instances. A CMS 660 can be managed by one or more leaf components 659 or core components 658, or combinations thereof. A CMS 660 can be located in the operator's premises or in the customer's premises or partly in both.

An NFV-O component such as a core components 658 or a leaf component 659 typically orchestrates a particular, predefined, territory. The territory may be one or more cloud management systems 660, one or more services, one or more customers, etc. Therefore, there can be an overlap between territories of different NFV-O components. For example, one NFV-O component may orchestrate a CMS 660, another NFV-O component may orchestrate a service that is at least partly provided by the same CMS 660, and additionally a third NFV-O component may orchestrate services for a particular customer connected to that same CMS 660.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 659 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 658 or leaf components 659 it supervises. Thus, such parent core component 658 may perform deployment optimization in terms of requirements and load values applied to whole subordinate (child) core components 658 or leaf components 659.

A customer may use the services of several telecom operators. For example, the customer may be an international company operating in several countries. Such a customer usually establishes a virtual private network (VPN) across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and a chain optimization module)

of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

Figure 7:
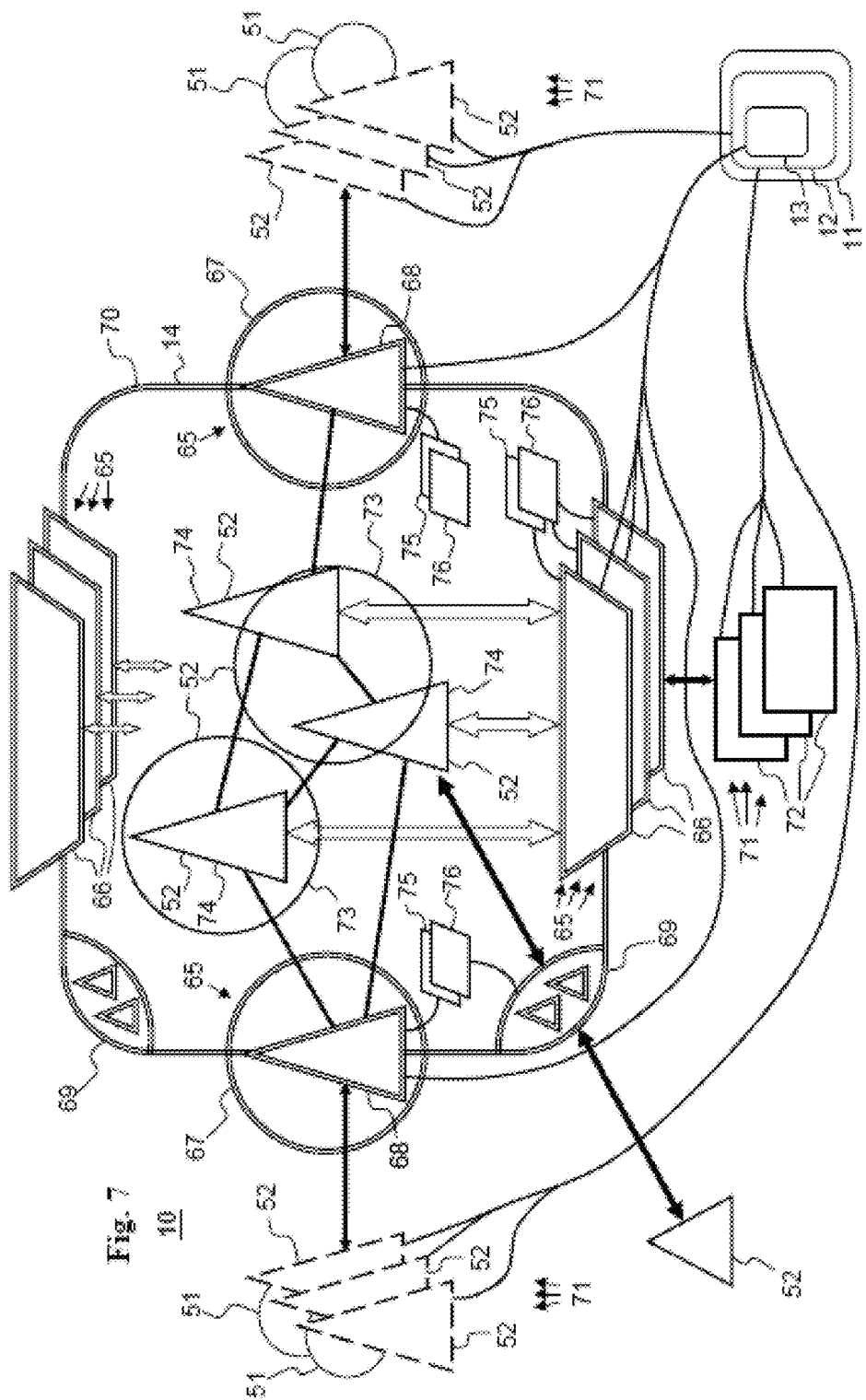
FIG. 7 is a simplified block diagram of a container, in accordance with one embodiment.

Reference is now made to FIG. 7, which is a simplified block diagram of a container 14, according to one embodiment.

As seen in FIG. 7, container 14 includes one or more borderline gateways 65. A borderline gateway 65 may be, for example: one or more borderline application programming interfaces (API) 66; one or more borderline VNFs 67, typically instantiated as corresponding one or more borderline VNF instances 68; and/or one or more borderline network interfaces 69.

Borderline gateway 65, such as API 66, VNFs 67, and VNF instances 68, and borderline network interfaces 69 constitute the border or interface 70 between container 14 and the rest of the NFV-based network 10. The rest of NFV-based network 10 includes external network entities, and is represented in FIG. 7 by VNFs 51, VNF instances 52 designated by numerals 71, and modules 72 (such as the modules of NFV management system 11 as disclosed above). Container 14 may include any of borderline API 66, or VNFs 67 or VNF instances 68, or borderline network interfaces 69, or combinations thereof.

An API 66 is a software program or subroutine that may be executed by another program or module, typically instantiated as a task. For example, this may include VNFs 51, typically instantiated as VNF instances 52. The module or task may reside inside the container (such as VNFs 74) and use API 66 to communicate with another task and/or program and/or module outside the container such as VNFs 72. The module or task may also reside outside the container and use API 66 to communicate with another task and/or program and/or module inside the container.

VNFs 67 is a software module, and VNF instance 68 is a corresponding task instantiating VNFs 67. A VNF instance 68 bridges between a module or a task residing inside the container (such as VNFs 74) and another task and/or program and/or module residing outside the container such as module 72. For example, the internal tasks (e.g., VNFs 74) sends a message to VNFs 67, which forwards the message to module 72, and vice versa.

Borderline network interface 69 functions like VNF 67 and VNF instance 68, but is an integral part of the container like API 66. For example, there may be a "Session Initiation Protocol (SIP) application server container". This container supports SIP signaling protocols and may include a borderline gateway 65 implemented as a borderline network interface 69, being an integral part of the container. In this example the borderline network interface 69 shields the internal functions (e.g., VNFs 52 and/or VNF instances 73) from sending and/or receiving SIP messages from out-of-the-container elements. Separating the external communication from the internal function implementation can be anywhere between the container filtering and applying policy to SIP messages that are sent by the internal functions. To complete the shielding, the internal function may communicate with the container, namely the borderline network interface 69, in a proprietary internal protocol (or API) and the container, namely the borderline network interface 69, provides the external SIP messages when appropriate.

As seen in FIG. 7, container 14 includes internal network entities such as one or more VNFs 51 designated by numeral 73, and VNF instances 52 designated by numeral 74, which constitute one or more application software programs contained and protected by container 14. Container 14 may include any number of VNFs 73 and their respective VNF instances 74. Any VNF 73 may be instantiated in any number of VNF instances 74. At least one of VNFs 73 and/or VNF instances 74 accesses borderline API 66, or borderline VNFs 67 and/or VNF instances 68, or borderline network interfaces 69, or any combination thereof.

VNFs 73 and/or VNF instances 74 may communicate between themselves, or may not, as required by the application or service they provide. However, VNFs 73 and VNF instances 74 may communicate with the rest of NFV-based network 10 (namely, VNFs 51, VNF instances 52, and modules 72) only via borderline API 66, or borderline VNFs 67 and/or VNF instances 68, or borderline network interfaces 69. It is appreciated that borderline VNFs 67 and/or VNF instances 68 may provide communication with modules 72, and that borderline API 66 may provide communication with VNFs 51, VNF instances 52. The same applies to borderline network interface 69.

As seen in FIG. 7, borderline API 66, borderline VNFs 67, and VNF instances 68, as well as borderline network interfaces 69, have access to protection parameters 75 and protection rules 76. Protection parameters 75 and protection rules 76 indicate to API 66, borderline VNFs 67, and VNF instances 68 how to protect the rest of NFV-based network 10 from VNFs 73 and VNF instances 74, and how to protect VNFs 73 and VNF instances 74 from the rest of NFV-based network 10. Protection parameters 75 and protection rules 76 are typically set by network administrator 23 typically by using container management module 13.

It is appreciated that protection parameters 75 and protection rules 76 may be provided by a vendor of a particular software product, such as an application software or a security protection software. For example, the application software may be used within the container. The security protection software may be used within the border or interface 70 of the container. It is appreciated that protection parameters 75 and protection rules 76 may be alternatively or additionally provided by an operator of the NFV-based network 10. It is also appreciated that protection parameters 75 and protection rules 76 may be alternatively or additionally provided by a customer using a particular container. It is further appreciated that protection parameters 75 and protection rules 76 may be alternatively or additionally automatically produced by any of borderline API 66, or borderline VNFs 67 and/or VNF instances 68, or borderline network interfaces 69 responsive to security attacks and similar events.

The internal network entities, such as VNFs 73 and VNF instances 74, may communicate with the rest of NFV-based network 10 (namely, VNFs 51, VNF instances 52, and modules 72) only via borderline API 66, or borderline VNFs 67 and/or VNF instances 68, or borderline network interfaces 69, because VNFs 73 and VNF instances 74 are not authorized and/or authenticated to communicate in NFV-based network 10, other than within container 14.

More information regarding such communication may be found in U.S. Provisional Patent Application No. 62/027,709, titled "Method, And Computer Program For Inter-Module Communication In A Network Based On Network Function Virtualization (NFV)", and U.S. patent application Ser. No. 14/572,729, titled "System, Method, And Computer Program For Inter-Module Communication In A Network Based On Network Function Virtualization (NFV)", which are incorporated by reference herein in their entirety.

It is appreciated that entities of NFV-based network 10, such as VNFs 51, VNF instances 52, and modules 72, can recognize, identify, and authenticate only borderline APIs 66, borderline VNFs 67 and/or VNF instances 68, as well as borderline network interfaces 69, and/or their communications, instructions, etc. In this respect, borderline APIs 66, borderline VNFs 67 and/or VNF instances 68 as well as borderline network interfaces 69 act as proxies for VNFs 73 and VNF instances 74.

As seen in FIG. 7, API 66, borderline VNFs 67, VNF instances 68 and borderline network interfaces 69 are supervised by NFV-O module 12, and more particularly by container management module 13, which is also used to set the protection parameters 75 and protection rules 76. NFV-O module 12 also collects load measurements associated with the rest of NFV-O module 12, such as VNFs 51 and VNF instances 52 and modules 72 of FIG. 7. NFV-O module 12 reports external load values to API 66, borderline VNFs 67, VNF instances 68 and borderline network interfaces 69.

NFV-O module 12, container management module 13, and borderline gateways 65 (e.g., any of API 66, borderline VNFs 67, VNF instances 68, borderline network interfaces 69 and combinations thereof) process three types of load measurements: internal load measured by VNF instances 74 and/or software, such as operating system, associated directly with VNF instances 74; borderline load measured by API 66, borderline VNFs 67, VNF instances 68 and borderline network interfaces 69; and external load measured by NFV-O module 12 for the rest of NFV-based network 10 or particular parts thereof.

The borderline load may be inbound or out bound. The outbound load constitutes the direct impact of container 14 on the rest of NFV-based network 10. The inbound load constitutes the direct impact of the rest of NFV-based network 10 on container 14.

It is appreciated that an NFV-O module 12 in the form of leaf component 63 (or core components 62) may be assigned to a particular container 14, or a group of containers 14.

The various load measurements, together with protection parameters 75 and/or protection rules 76, may be used by various components. These components may include, for example: API 66; borderline VNFs 67; VNF instances 68 and borderline network interfaces 69 that protect network entities of NFV-based network 10 external to container 14 from excessive impact originated by network entities such as modules; and VNFs 51 and/or VNF instances 52 internal to container 14 to protect network entities internal to container 14 from excessive impact by network entities of NFV-based network 10 external to container 14.

The various load measurements may be utilized to determine or calculate a protective limit, determine or calculate load or consumption value and compare it with a protective limit to determine a protection event (or a protection breaching event), and/or determine the protective action to be taken. A protective event and/or a protective action may also be reported, typically to an NFV-O module 12, and/or a network entity involved with the protection event.

Typically, the protective action limits the impact on the NFV-based network 10 and its network entities. Particularly, the protective action limits the impact of one or more internal network entities on one or more external network entities. Alternatively or additionally, the protective action limits the impact of one or more external network entities on one or more internal network entities.

Such an impact may be, for example: an impact on a direct external network entity, which is typically operative to process a command or data provided by one or more internal network entities; an impact on an external resource of the NFV-based network, the resource being external to the container; an impact on an indirect external network entity, which typically shares a network resource with one or more direct external network entities; and/or an impact on an internal network entity, the impact being associated with a command or data received by the borderline gateway from one or more external network entities.

Figure 8:
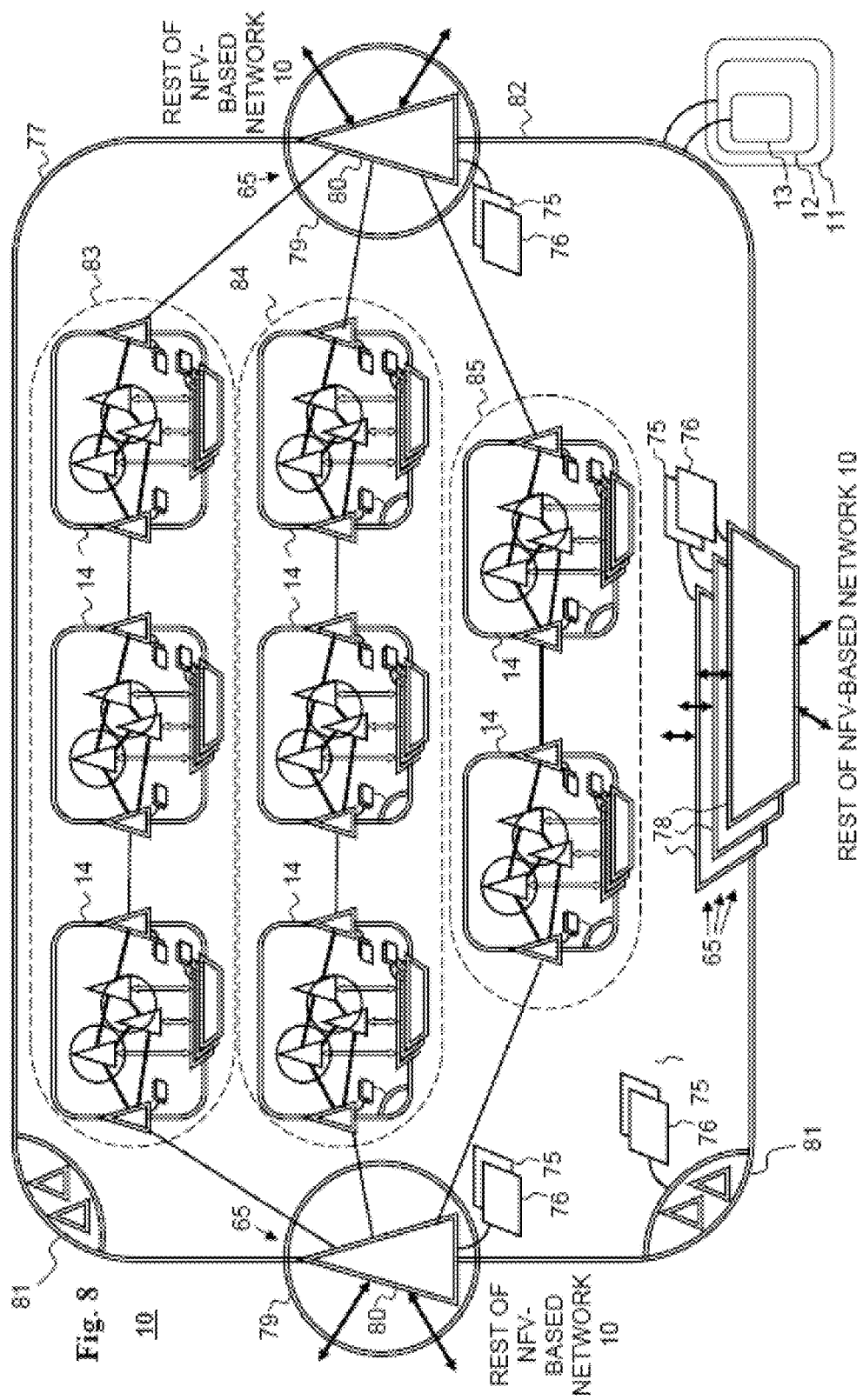
FIG. 8 is a simplified block diagram of a super-container, in accordance with one embodiment.

Reference is now made to FIG. 8, which is a simplified block diagram of a super-container 77, according to one embodiment.

As seen in FIG. 8, super-container 77 includes one or more borderline application programming interfaces (APIs) 78, and/or one or more borderline VNFs 79 instantiated as borderline VNF instances 80, and/or one or more network borderline interfaces 81.

Borderline API 78, VNFs 79, VNF instances 80, and network borderline interfaces 81 constitute the border or interface 82 between super-container 77 and the rest of the NFV-based network 10 (not shown). Super-container 77 may include any of borderline APIs 66, or VNFs 67 or VNF instances 68, or borderline network interfaces 69, or combinations thereof.

Super-container 77 may include any number of containers 14 as well as VNFs 51 and VNF instances 52 not contained in any container 14. It is appreciated that a super-container 77 may include one or more other super-containers 77 and multiple nesting of super-containers is possible.

In the example shown in FIG. 8, super-container 77 includes services 83, 84 and 85. A service may include one or more containers 14 (as well as VNFs 51 and VNF instances 52 not contained in any container 14). Each of services 83, 84 and 85 shown in FIG. 8 includes a plurality of containers 14. Services 83 and 84 are two instances of the same service (for example, serving two customers).

One reason for deploying a service within a plurality of containers 14 is that the service is deployed in various parts of the NFV-based network 10, and each part of the NFV-based network 10 requires a different protection for, or from, the associated part of the service. After the service is divided into, and deployed within, several containers 14, the super-container 77 provides protection to, or from, the entire service.

As seen in FIG. 8, super-container 77, as well as containers 14 included in super-container 77, are all managed and supervised by NFV-O module 12, and more particularly by container management module 13. Particularly, NFV-O module 12, and container management module 13 manage and supervise each of API 78, VNFs 79, VNF instances 80, and network borderline interfaces 81, as well as API 66, borderline VNFs 67, VNF instances 68 and borderline network interfaces 69 of containers 14 included in super-container 77.

NFV-O module 12, and more particularly by container management module 13, are also used to set the protection parameters 75 and protection rules 76. NFV-O module 12 also collects load measurements associated with the rest of NFV-based network 10. NFV-O module 12 reports external load values to API 78, VNFs 79, VNF instances 80, and network borderline interfaces 81, as well as API 66, borderline VNFs 67, VNF instances 68, and borderline network interfaces 69 of containers 14 included in super-container 77.

It is appreciated that an NFV-O module 12 in the form of leaf component 63 (or core components 62) may be assigned to a particular super-container 77, or a group of super-containers 77.

One type of protection provided by container 14 and/or super-container 77 is against over-loading and/or over-consumption. For example, a container 14 or a super-container 77 may protect the network, or a particular part of NFV-based network 10, from excessive communication load (bandwidth consumption) by one or more of the VNFs or VNF instances contained in the container 14 and/or super-container 77.

Over-loading and/or over-consumption may refer to any possible load or consumption of any type of resource such as processing power, memory, storage, bandwidth, energy (electric power, cooling etc.), etc. Over-loading and/or over-consumption may be measured, assessed or determined directly or indirectly. Indirect measurement or assessment refers, for example, to excessive latency or jitter caused to function, processes or services of the NFV-based network 10 that are external or unrelated to the services or processes included within a container 14 or a super-container 77. For example, a process or a service within a container 14 or a super-container 77 may load a processor, a storage facility, or a transmission line, so that another process or service external or unrelated to the container 14 or super-container 77 may observe excessive latency or jitter.

It is appreciated that a particular VNF instance, module, processor, storage facility, or transmission line may suffer an overload even if it eventually rejects the overloading requests, similar, for example, to a DDOS attack. Such overload situation is blocked at the container 14 side by the borderline API 66, VNFs 67, and/or VNF instances 68 (or by the borderline API 78, VNFs 79, VNF instances 80, and network borderline interfaces 81 of the super-container 77), thus eliminating the load from the VNF instance, processor, storage facility, or transmission line external to the container or super-container.

Similarly, there may be a critical service that should be protected from external processes such as malicious software or runaway processes. The critical service may be placed in a container 14 or super-container 77 where its internal VNF-instances are protected from the rest of the NFV-based network 10. Any call or communication bound to any internal VNF instance are blocked by the API 66, VNFs 67, and/or VNF instances 68 of container 14 (or by the borderline API 78, VNFs 79, VNF instances 80, and network borderline interfaces 81 of the super-container 77).

As shown in FIGS. 7 and 8, each of API 66, VNFs 67, VNF instances 68, borderline network interfaces 69, borderline API 78, VNFs 79, VNF instances 80 and/or network borderline interfaces 81 may have access to protection parameters 75 and/or protection rules 76. Protection parameters 75 and/or protection rules 76 may be set independently and/or separately for each of a plurality of entities.

These entities may include each super-container 77 (e.g. for a group of services provided to a particular customer, or for a group of instances of the same service provided to different customers, etc.). The entities may also include each service (e.g., services of services 83, 84 and 85 shown in FIG. 8), and/or each service instance.

As another example, the entities may include each container 14, including different containers of the same service, or service instance, such as for each container 14 of service 83 of FIG. 8. As another example, the entities may include each API 66, VNFs 67, VNF instances 68 of any particular container 14. Further, the entities may include each borderline API 78, VNFs 79, VNF instances 80 and/or network borderline interfaces 81 of any particular super-container 77.

This nested structure of multiple borderlines (70, 82) with their plurality of borderline gateways 65 (e.g., API 66, VNFs 67, VNF instances 68, API 78, VNFs 79, VNF instances 80, and/or network borderline interfaces 81) provides high flexibility and high accuracy in setting up the protection level, while maintaining high efficiency of the usage of the NFV-based network 10 and parts thereof. Furthermore, this system provides increased protection through its nested structure of multiple borderlines, so that even if one borderline is compromised the excessive load will be contained.

Protection parameters 75 is a list or a database of values set by administrator 23 using container management module 13. These values are typically threshold values, setting the threshold for a particular measurement, such as a measurement of load or consumption. A load measurement (or consumption measurement) may measure: processing load, memory consumption, storage consumption, storage latency, communication bandwidth consumption, communication latency, jitter, energy consumption or dissipation, etc. A protection parameter, or threshold, is typically associated with a protection event. A protection event is typically triggered by one or more protection parameters, or a combination of protection parameters. Protection parameters 75 may therefore be viewed as a database of protection events, where each event is associated with one or more protection thresholds, or load thresholds.

Protection rules 76 is a list or a database of values set by administrator 23 using container management module 13. These values are typically algorithms, or short programs that dictates the response to a particular protection event, or a combination of protection events. Three main types of rules are described.

The first are rules for determining a protection event based on one or more load measurement and threshold values, typically by comparing a load measurement, or a combination of load measurements, with a threshold value, or a combination of threshold values. The protection event typically triggers one or more protective actions.

The second type are rules for determining a protection event based on communicated content. For example, a firewall application protecting Session Initiation Protocol (SIP) communication. The firewall uses rules to validate the protocol, such as messages types, messages order, protocol compliance, malicious and/or fraud use, etc. The container can thus use content rules to provide borderline protection regarding particular applicative content and/or protocol related issues. It is appreciated that the container may protect any of the internal or external entities.

The third type are rules for executing a protective action (or a group of protective actions). A protective action may include, for example, dumping a function call (API) or a communication received by the borderline gateway 65. Another example of a protective action includes returning the function call or the communication received by the borderline gateway 65 to the originator with or without indicating an error or an exception.

Another example of a protective action includes instructing a change of a particular internal process. For example, this may include a process executed by one or more VNF instances 52, and/or one or more borderline gateways 65 of one or more particular containers 14, or one or more borderline gateways 65 of super-container 77 (e.g. to reduce a particular load, etc.).

Another example of a protective action includes aborting or rejecting a particular internal process, and optionally reinitializing the process. Another example of a protective action includes determining a security breach. Another example of a protective action includes reporting the protection event and/or protective action taken to container management module 13.

Figure 9:
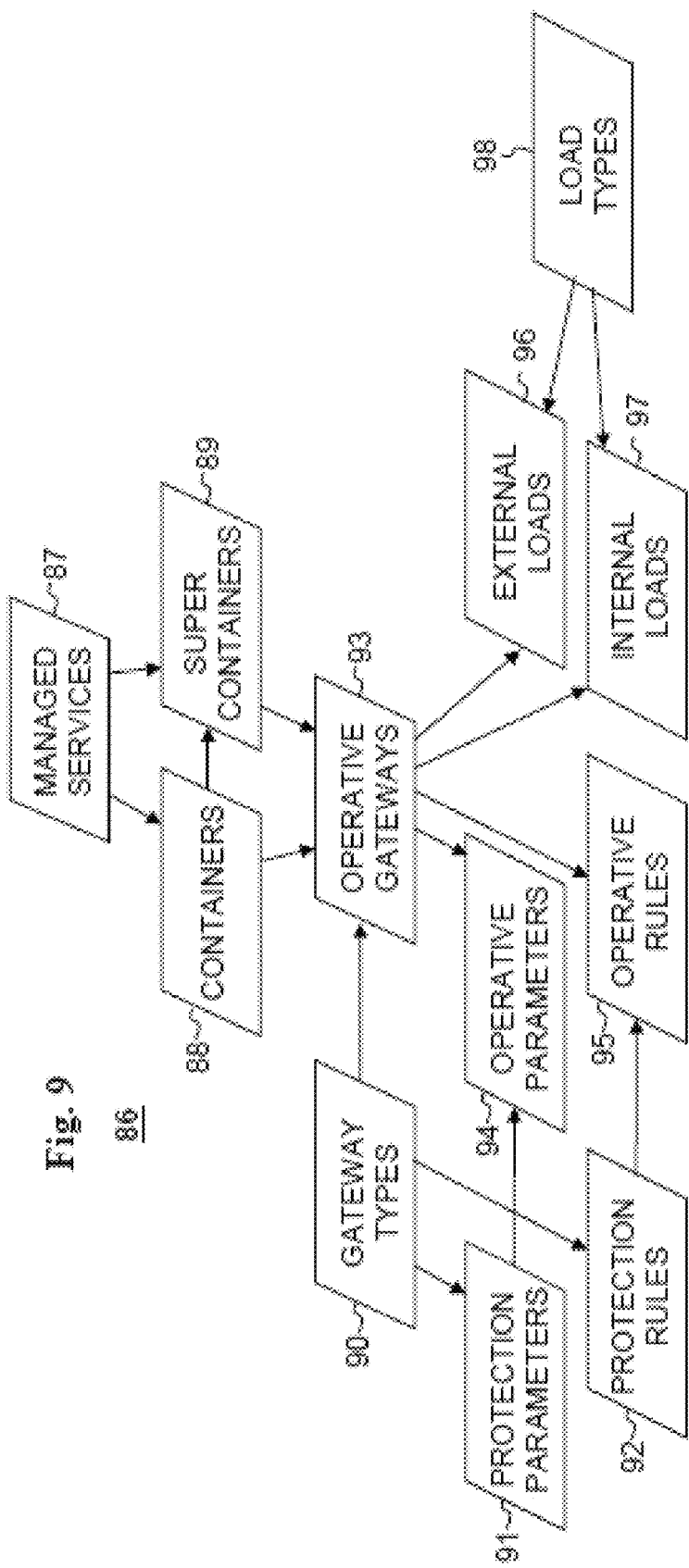
FIG. 9 is a simplified block diagram of a service seclusion data structure, in accordance with one embodiment.

Reference is now made to FIG. 9, which is a simplified block diagram of a service seclusion data structure 86, according to one embodiment.

As seen in FIG. 9, service seclusion data structure, or database, 86 is preferably a database including a plurality of data types, each including a plurality of records. Record types of service seclusion data structure 86 typically includes various data types, or types of data structures. For example, record types of service seclusion data structure 86 may include a services database 87 of services managed by container management module 13. Container management module 13 is typically a part of, or associated with, a particular NFV-O module 12. The services managed by container management module 13 are therefore typically at least a part of the services managed by the particular NFV-O module 12. Services database 87 includes a record for each service managed by container management module 13. These are secluded services in the sense that they are contained in a container 14 and/or a super container 77.

Record types of service seclusion data structure 86 may also include containers database 88 including a record for each container 14 managed by the particular container management module 13, and a super-containers database 89 including a record for each super-container 77 managed by the particular container management module 13. Each record of container 14 and/or a super container 77 is associated with a service record of services database 87, and each service record of services database 87 is associated with at least one container record and/or super container record.

Record types of service seclusion data structure 86 may also include gateway-types database 90, including available types of borderline APIs 66, and/or borderline VNFs 67.

Record types of service seclusion data structure 86 may also include a protection parameters database 91 and a protection rules database 92, respectively containing records for types of protection parameters 75 and protection rules 76 as described above. Each record of a type of borderline APIs 66 and borderline VNFs 67 typically references one or more records of protection parameters 75 and protection rules 76 in databases 91 and 92, respectively.

Record types of service seclusion data structure 86 may also include an operative-gateways database 93 typically including a record for each borderline APIs 66 and/or VNF instances 68 used in a container 14 and/or a super container 77 managed by the particular container management module 13.

Record types of service seclusion data structure 86 may also include an operative-parameters database 94 and an operative-rules database 95 typically including a record for each parameter and rule, respectively, used by an operative borderline API 66 and/or operative VNF instance 68 used in a container 14 and/or a super container 77 managed by the particular container management module 13.

Record types of service seclusion data structure 86 may also include an external-loads database 96 and an internal-loads database 97 typically including a record for each load source and its respective load type (from load type database 98) associated with an operative parameter and/or operative rule, as used by an operative borderline API 66 and/or operative VNF instance 68 used in a container 14 and/or a super container 77 managed by the particular container management module 13.

As seen in FIG. 9, each service managed, secluded, and/or protected by container management module 13 is defined in seclusion database 86, and is associated with the containers 14 and/or a super containers 77 containing the service. Each of the containers 14 and/or a super containers 77 is associated with the borderline APIs 66, border line VNFs 67 and/or VNF instance 68 (i.e., gateways 65) it uses. Each of gateways 65 (borderline APIs 66, border line VNFs 67 and/or VNF instance 68) is associated with the protection parameters 75 and protection rules 76 it uses, as well as the load types and their particular sources.

Using service seclusion database 86, container management module 13 has the information it needs to initialize and manage the containers 14 and/or a super containers 77 it manages, collect and distributed to the appropriate gateways the load information they require, and collect for the gateways reports of protection events and analyze them.

Figure 10:
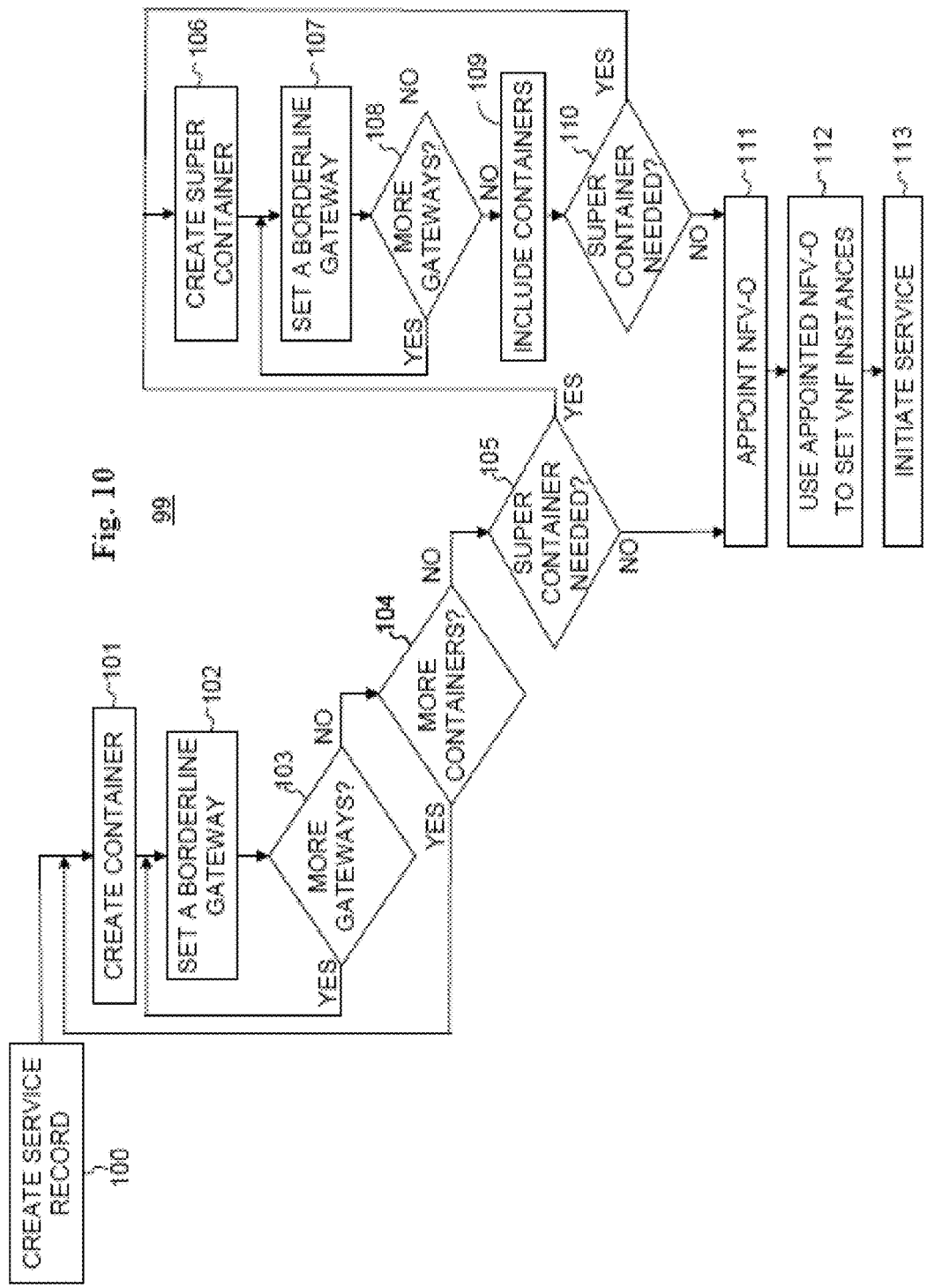
FIG. 10 is a simplified flow chart of a process for initiating a contained service, in accordance with one embodiment.

Reference is now made to FIG. 10, which is a simplified flow chart of a process 99 for initiating a contained service, according to one embodiment.

It is appreciated that the order of steps as described in one or more of the flow charts herewith may change depending on specific implementations.

Process 99 is typically used by administrator 23 using container management module 13. As seen in FIG. 10, process 99 typically starts in step 100 by creating a secluded service record in services database 87. Process 99 typically proceeds to step 101 to create a container 14 for the secluded service by creating a new container record in containers database 88. Process 99 typically proceeds to steps 102 and 103 to define one or more borderline gateways 65 (borderline APIs 66, border line VNFs 67 and/or VNF instance 68) for the new container 14. If more containers are required (step 104), steps 101, 102 and 103 are repeated until all VNFs 51 of the service are placed in containers. It is appreciated that in some situations VNF instances 52 of a secluded service may be placed in a super container and not with any container.

If a super-container 77 is required (step 105), for example to contain a plurality of containers 14, such super-container is created (step 106), typically by creating a new super-container record in super-containers database 89. Thereafter, in steps 107 and 108, borderline gateways 65 of the particular super-container 77 are created (typically as records in operative gateways database 93, and associated with the super-container record in super-containers database 89).

Process 99 then typically proceeds to step 109 to include containers 14 in the new super-container 77, typically by associating the appropriate container records in the containers database 88 with the particular super-container record in super-containers database 89. If super-container nesting is required (step 110), steps 106, 107, 108 and 109 are repeated where step 109 used to include the nested super-containers in the nesting super-container.

If super-container nesting is completed, or not needed (step 110) or no super-container is needed (step 105), process 99 typically proceeds to step 111 to appoint an NFV-O module 12 (or a core components 62 or leaf components 63) to manage the container 14 or the super-container 77.

Thereafter, in step 112, VNFs 51 are installed in the appropriate container 14 (and super-container 77) and their respective VNF instances 52 are instantiated, typically using the appointed NFV-O module 12 When all the VNF instances 52 are instantiated the service is initiated (step 113).

Figure 11:
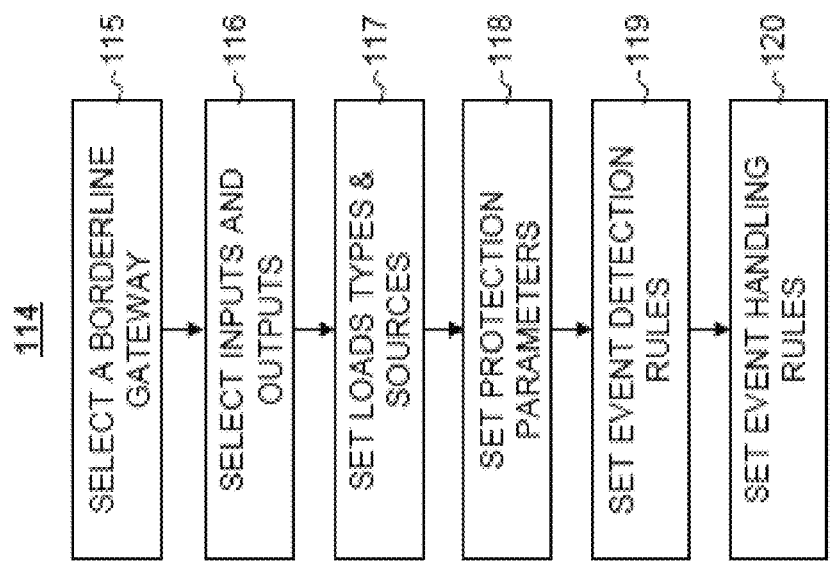
FIG. 11 is a simplified flow chart of a gateway setting procedure, in accordance with one embodiment.

Reference is now made to FIG. 11, which is a simplified flow chart of a gateway setting procedure 114, according to one embodiment.

Gateway setting procedure 114 is an example of an embodiment of step 102 and/or 107 of procedure 99 described with reference to FIG. 10.

As seen in FIG. 11, gateway setting procedure 114 typically starts in step 115 by selecting a borderline gateway type, typically from one of the types in gateway-types database 90, and creating a new operational borderline gateway record in operative-gateways database 93. Selecting a borderline gateway includes, for example, selecting between an API 66 and a VNF instance 68, if both solutions are available to the same protection situation.

Gateway setting procedure 114 typically proceeds to step 116 to select inputs and outputs for the selected borderline gateway 65. An API 66 is typically pre-associated with a software module as the output and is associated with the calling software module as the input. A VNF instance 68 requires explicit association with other 66 VNF instances 68 from which communications are to be received from, or send to. In some cases, such VNF instances 68 are not yet defined, and appropriate communication hooks are defined for the particular borderline gateway 65. The communication hooks will be later used to identify the relevant VNF instances 68 with which the borderline gateway communicates.

Gateway setting procedure 114 proceeds to step 117 to set the load information, typically by selecting load types (from load type database 97) and their respective internal and external load sources (from external and internal load source databases 96 and 97). The selected load types and their respective sources are associated with the borderline gateway record in the operative-gateways database 93.

Gateway setting procedure 114 proceeds to step 118 to set the protection parameters for the borderline gateway, typically by selecting protection parameters from protection parameters database 91. A record is then created in operative-parameters database 94 for the selected protection parameters 75, and associated with the borderline gateway record in the operative-gateways database 93.

Gateway setting procedure 114 proceeds to steps 119 and 120 to set the protection rules for the borderline gateway, typically by selecting protection rules from protection rules database 92. A record is then created in operative-rules database 95 for the selected rules 76, and associated with the borderline gateway record in the operative-gateways database 93. As seen in FIG. 11, it is possible to set rules for detecting protection events and rules for handling a protection event.

It is appreciated that steps 118, 119 and 120 enable a user to define, for example: a rule for a borderline gateway to calculate a value of an impact; a rule for a borderline gateway to determine a protection event; a rule for a borderline gateway to select a method for handling a protection event, or a protective action responsive to the protection event; and/or a rule for a borderline gateway to report a protection event, or a protective action handling a protection event.

Figure 12:
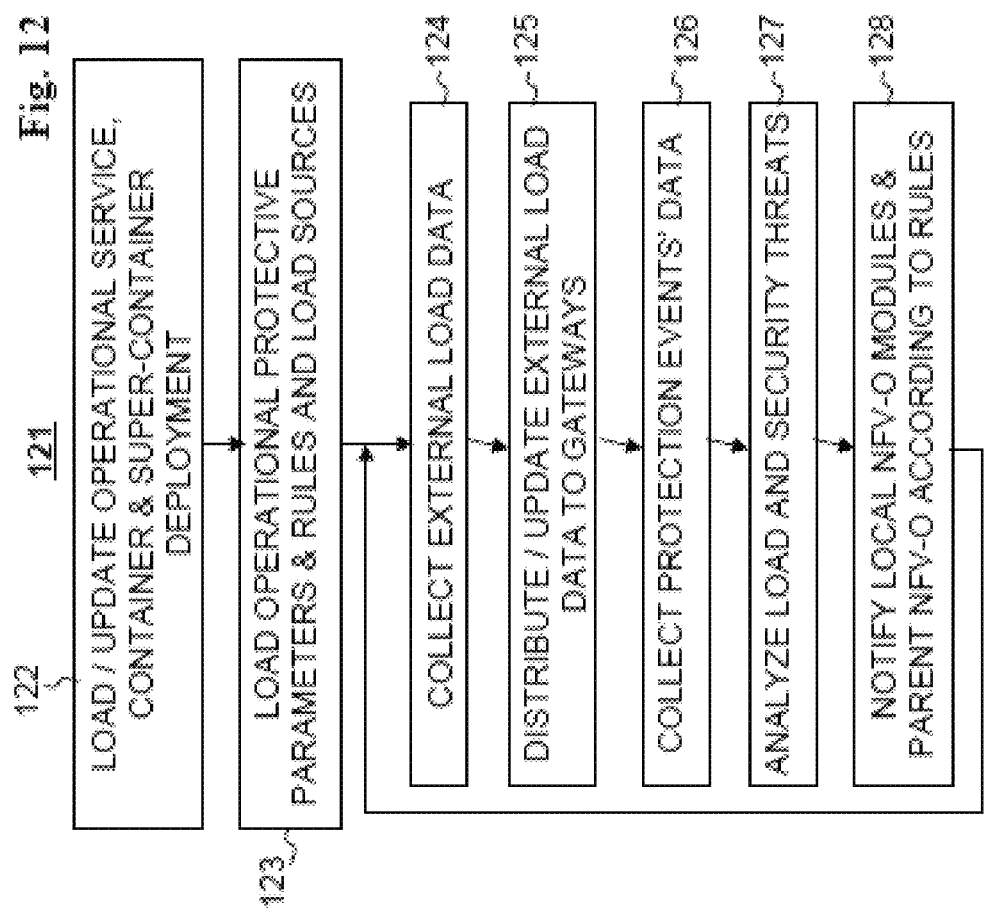
FIG. 12 is a simplified flow chart of a run-time process of a container management module, in accordance with one embodiment.

Reference is now made to FIG. 12, which is a simplified flow chart of a run-time process 121 of container management module 13, according to one embodiment.

Run-time process 121 is executed by container management module 13 continuously or repetitively for managing operational containers 14 and operational super-containers 77 listed in its containers database 88 and super-containers database 89, respectively. Container management module 13 therefore executes run-time process 121 for each of its services, their respective operational containers 14 and operational super-containers 77 and their respective borderline gateways 65.

Run-time process 121 typically starts in step 122 by loading a service from the managed services database 87. If the particular service is associated with a super-container 77 the super-container record is loaded from the super-container database 89, and then a container record is loaded from containers database 88.

Run-time process 121 typically proceeds to step 123 and uses the container record (or super-container record, if relevant) to load a borderline gateway record (as defined in the respective container or super-container record) from the operative gateways database 93. Using the borderline gateway record, run-time process 121 loads the protection parameters 75, protection rules 76, load types and sources from their respective databases (94, 95, 96, 97, and 98 as shown and described with reference to FIG. 9).

It is appreciated that step 123 is repeated for each and every borderline gateway 65 of each and every container 14 and super-container 77 of each and every service managed by the particular container management module 13.

It is repeated that the deployment of the service, the deployment of the super-container 77, the deployment of containers 14 and the deployment of borderline gateways 65 may change with time according to operation needs, load optimization, hardware faults, etc. Therefore, steps 122 and/or 123 may be repeated to update run-time process 121 following redeployment events. Typically, NFV-O module 12 instructs run-time process 121 to process update by executing steps 122 and/or 123.

Thereafter, run-time process 121 executes steps 124, 125, 126, 127, and 128 continuously and/or repetitively to collect external load data, distribute external load data to the relevant borderline gateways 65, collect protection event reports from the borderline gateways 65, analyze the current loads, possible load threats, and possible security threats, and accordingly notify the relevant NFV-O modules 12.

Figure 13:
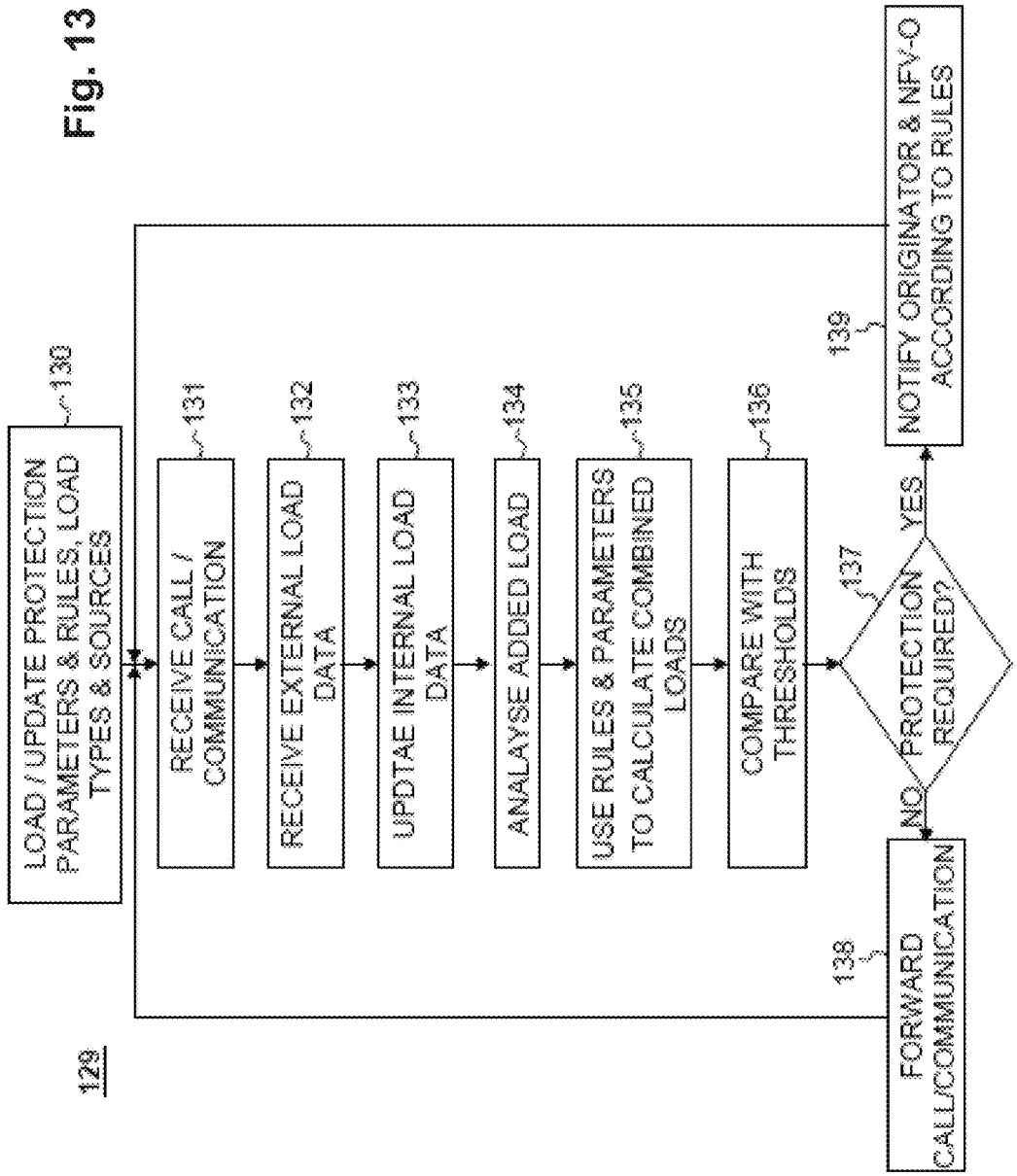
FIG. 13 is a simplified flow chart of a gateway process, in accordance with one embodiment.

Reference is now made to FIG. 13, which is a simplified flow chart of a gateway process 129, according to one embodiment.

Gateway process 129 is typically executed by a borderline gateway 65, such as borderline API 66, or borderline VNF 67 and/or VNF instance 68. Gateway process 129 is typically executed by every borderline gateway 65 continuously, or repeatedly. For example, gateway process 129 is may be executed by a borderline gateway 65 when: a borderline API 66 is called (e.g., receives a function call) by a contained module or process such as a VNFs 51 and/or a VNF instances 52; a borderline VNF instance 68 receives a communication from a contained VNF instances 52, typically bound to a VNF instance 52 external to the container 14 or super-container 77; and/or a borderline VNF instance 68 receives a communication from a VNF instances 52 external to the container 14 or super-container 77, typically bound to a contained (internal) VNF instance 52.

When a borderline gateway is initiated (instantiated) gateway process 129 starts typically with step 130 by loading operational data from the respective databases 94, 95, 96, 97, and 98 as shown and described with reference to FIG. 9. It is appreciated that due to redeployment of the service, and particularly redeployment of VNF instances 52, containers 14 and/or super-containers 77, step 130 may be repeated to update the borderline gateway.

Gateway process 129 then typically proceeds to step 131 to receive a function call (e.g., API 66) or a communication (e.g., VNF instance 52). When a call or a communication is received, gateway process 129 proceed to steps 132 and 133 to receive and/or update the current load data.

Gateway process 129 then typically proceeds to step 134 to analyze the impact of the currently received call or communication on the relevant load conditions. For example, gateway process 129 determines which loads are affected and what are the values of such effects.

Gateway process 129 then typically proceeds to steps 135 and 136, and using respective protection rules and protection parameters compares the combined loads with threshold values to detect one or more protection events.

If (step 137) a protection event is not detected, gateway process 129 forwards (step 138) the call or the communication to the appropriate module or VNF instance 52.

If (step 137) a protection event is detected, gateway process 129 uses the appropriate protection event handling rules (step 139) to block the call or the communication, inform the originator (e.g., the calling module or the VNF instance 52 that sent the communication) and optionally inform the appropriate NFV-O 12.

It is appreciated that gateway process 129 enables a borderline gateway (automatically and in real-time) to: calculate a value of a possible impact of a current communication received by the borderline gateway; determine a protection event associated with a current communication or call received by the borderline gateway; limit and impact, for example, by rejecting a call or a communication received by the borderline gateway; report a protective action such as a rejection of a communication or a call to the network entity associated with the impact, or call, or communication; report the protection event to an NFV-O; and/or report the protective action, or the handling of the protection event, to an NFV-O.

Figure 14:
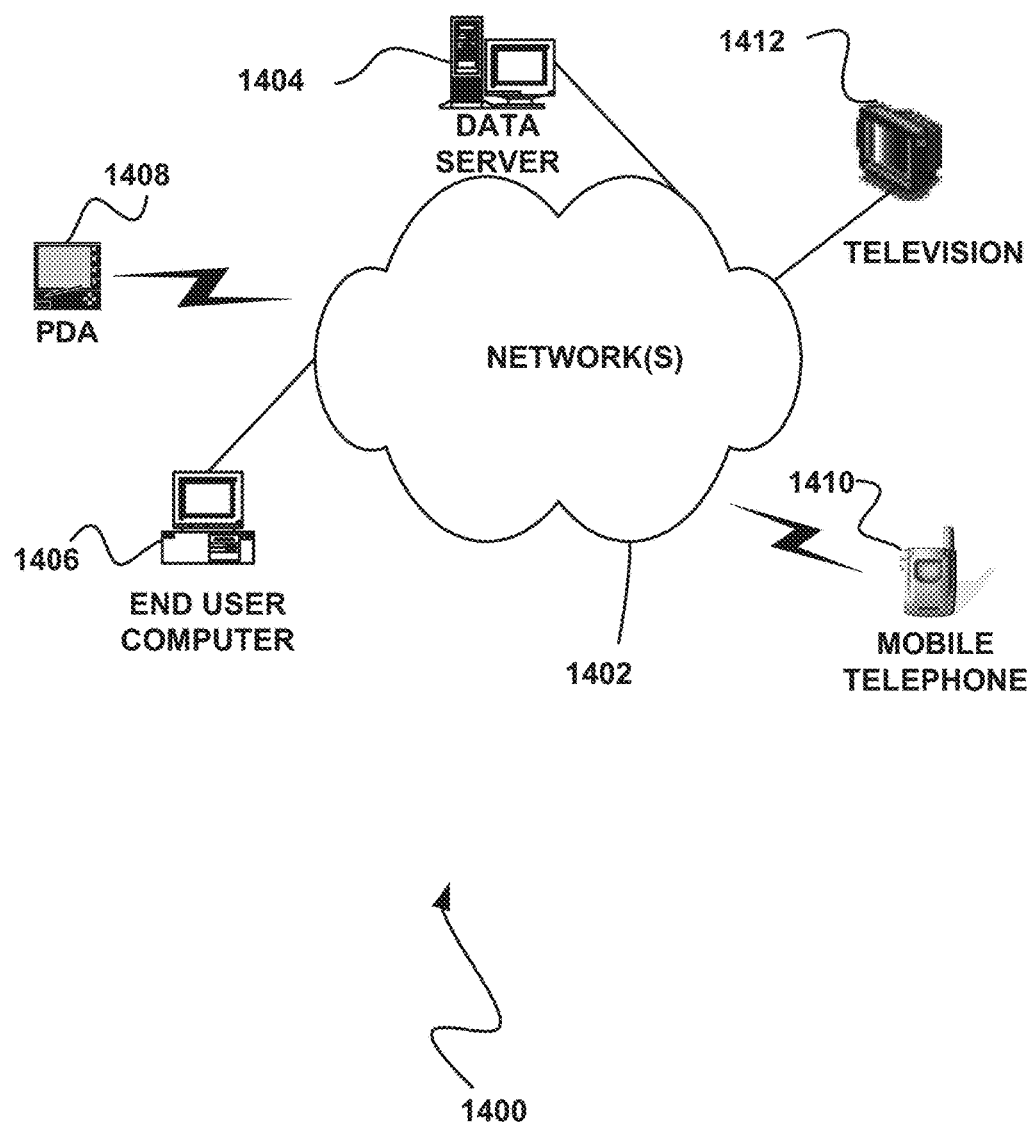
FIG. 14 illustrates a network architecture, in accordance with one possible embodiment.

FIG. 14 illustrates a network architecture 1400, in accordance with one possible embodiment. As shown, at least one network 1402 is provided. In the context of the present network architecture 1400, the network 1402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1402 may be provided.

Coupled to the network 1402 is a plurality of devices. For example, a server computer 1404 and an end user computer 1406 may be coupled to the network 1402 for communication purposes. Such end user computer 1406 may include a desktop computer, lap-top computer, and/or any other type of logic. Still yet, various other devices may be coupled to the network 1402 including a personal digital assistant (PDA) device 1408, a mobile phone device 1410, a television 1412, etc.

Figure 15:
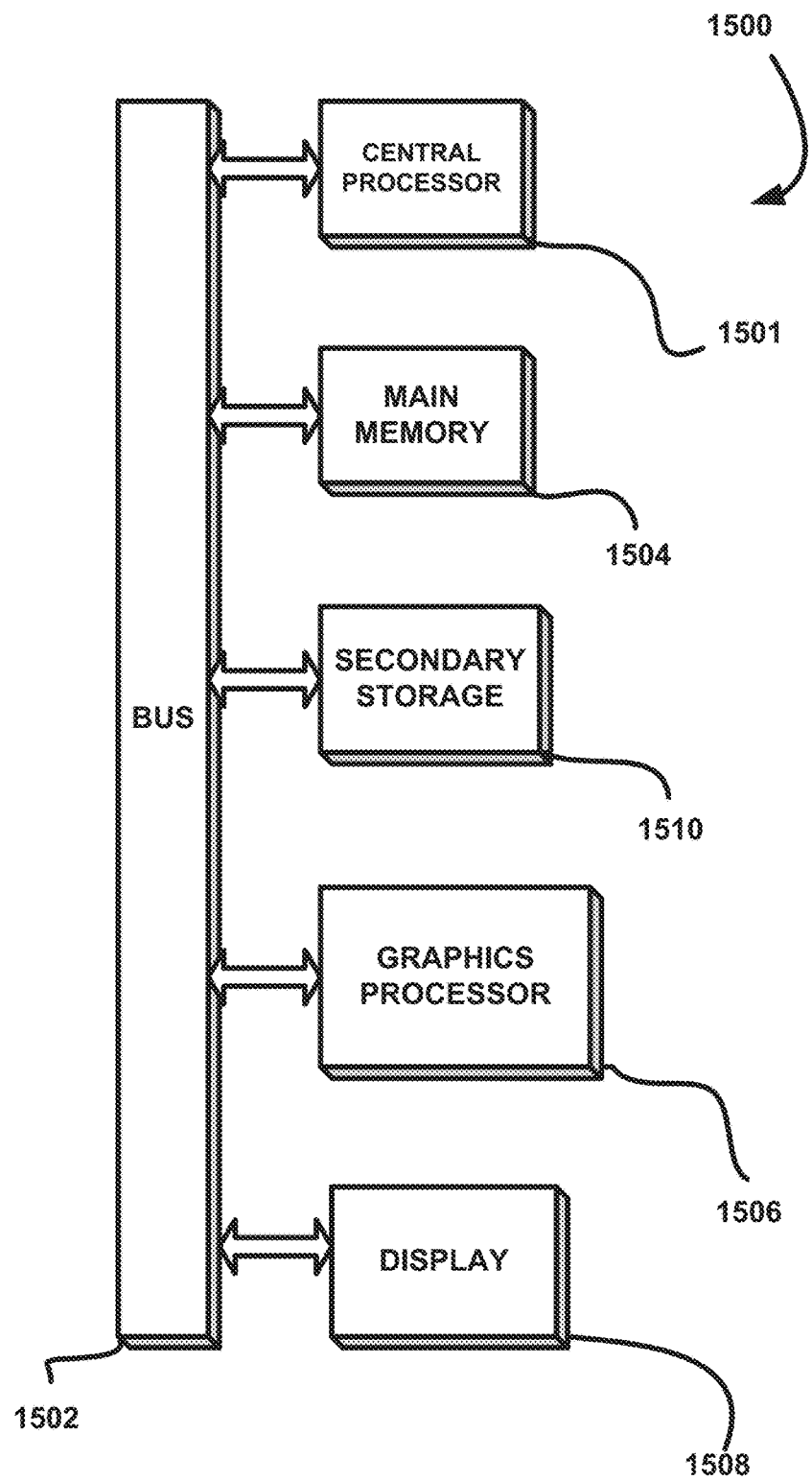
FIG. 15 illustrates an exemplary system, in accordance with one embodiment.

FIG. 15 illustrates an exemplary system 1500, in accordance with one embodiment. As an option, the system 1500 may be implemented in the context of any of the devices of the network architecture 1400 of FIG. 14. Of course, the system 1500 may be implemented in any desired environment.

As shown, a system 1500 is provided including at least one central processor 1501 which is connected to a communication bus 1502. The system 1500 also includes main memory 1504 [e.g. random access memory (RAM), etc.]. The system 1500 also includes a graphics processor 1506 and a display 1508.

The system 1500 may also include a secondary storage 1510. The secondary storage 1510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1504, the secondary storage 1510, and/or any other memory, for that matter. Such computer programs, when executed, enable the system 1500 to perform various functions (as set forth above, for example). Memory 1504, storage 1510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for limiting an impact of at least one internal network entity, on a network function virtualization (NFV) based communication network hosting said at least one internal network entity, said method comprising:

providing a container comprising at least one borderline gateway;

providing within said container said at least one internal network entity, wherein said at least one internal network entity comprises at least one of:
a software module;
a virtual network function (VNF); and
a VNF instance; and assigning said borderline gateway at least one protective limit;

wherein said NFV-based communication network comprises at least one external network entity, said at least one external network entity is external to said container;

wherein said at least one internal network entity communicates with any of said at least one external network entity only via said at least one borderline gateway; and wherein said borderline gateway is operative to use said protective limit to limit said impact on said NFV-based communication network.

2. The method according to claim 1 wherein said impact on said NFV-based communication network comprises at least one of:

an impact on a direct external network entity, wherein said direct external network entity is operative to process at least one command provided by said at least one internal network entity;

an impact on an external resource of said NFV-based communication network, said external resource being external to said container, an impact on an indirect external network entity, wherein said indirect external network entity shares a resource with at least one direct external network entity; and an impact on said at least one internal network entity associated with a communication received by said borderline gateway from said at least one external network entity.

3. The method according to claim 1 wherein said impact is associated with at least one of:
- a load on a resource of said NFV-based communication network, said resource not being part of said container; and
- a consumption of a resource of said NPV-based communication network, said resource not being part of said container.

4. The method according to claim 1 wherein said impact is associated with at least one of:
- processing load:
- memory consumption;
- storage consumption;
- bandwidth consumption;
- communication repetition;
- increased latency;
- increased jitter; and
- energy consumption.

5. The method according to claim 1 wherein said borderline gateway comprises at least one of:
- an application programming interface (API);
- a virtual network function (VNF);
- a VNF instance; and
- a borderline network interface.

6. The method according to claim 1 additionally comprising:
- changing said protective limit automatically, in real-time, according to at least one of load and consumption produced by said at least one external network entity.

7. The method according to claim 1 additionally comprising:
- enabling a user to define at least one rule for calculating a value of said impact; and
- using said rule, by said borderline gateway, automatically, in real-time, to calculate said value of a possible impact of a current communication received by said borderline gateway.

8. The method according to claim 1 additionally comprising:
- enabling a user to define at least one rule for determining a protection event; and
- using said rule, by said borderline gateway, automatically, in real-time, to determine said protection event associated with a current communication received by said borderline gateway.

9. The method according to claim 8 additionally comprising at least one of:
- rejecting said current communication;
- reporting said rejecting;
- reporting said protection event to a network function virtualization orchestration (NFV-O); and
- reporting said handling of said protection event to said NFV-O.

10. The method according to claim 1 additionally comprising:
- enabling a user to define at least one rule for handling a protection event; and
- using said rule, by said borderline gateway, automatically, in real-time, to limit said impact.

11. A computer program product embodied on a non-transitory computer readable medium for limiting an impact of at least one internal network entity, on a network function virtualization (NFV) based communication network hosting said at least one internal network entity, said computer program product comprising:
- computer code for providing a container comprising at least one borderline gateway;
- computer code for providing within said container said at least one internal network entity, wherein said at least one internal network entity comprises at least one of:
  - a software module;
  - a virtual network function (VNF); and
  - a VNF instance; and
- computer code for assigning said borderline gateway at least one protective limit;
- wherein said computer program product is operable such that said NFV-based communication network comprises at least one external network entity, said at least one external network entity is external to said container,
- wherein said computer program product is operable such that said at least one internal network entity communicates with any of said at least one external network entity only via said at least one borderline gateway; and
- wherein said computer program product is operable such that said borderline gateway is operative to use said protective limit to limit said impact on said NFV-based communication network.

12. The computer program product according to claim 11 wherein said computer program product is operable such that said impact on said NFV-based communication network comprises at least one of:
- an impact on a direct external network entity, wherein said direct external network entity is operative to process at least one command provided by said at least one internal network entity;
- an impact on an external resource of said NFV-based communication network, said external resource being external to said container;
- an impact on an indirect external network entity, wherein said indirect external network entity shares a resource with at least one direct external network entity; and
- an impact on said at least one internal network entity associated with a communication received by said borderline gateway from said at least one external network entity.

13. The computer program product according to claim 11 wherein said computer program product is operable such that said impact is associated with at least one of:
- a load on a resource of said NFV-based communication network, said resource not being part of said container; and
- a consumption of a resource of said NFV-based communication network, said resource not being part of said container.

14. The computer program product according to claim 11 wherein said computer program product is operable such that said impact is associated with at least one of:
- processing load;
- memory consumption;
- storage consumption;
- bandwidth consumption;
- communication repetition;
- increased latency:
- increased jitter; and
- energy consumption.

15. The computer program product according to claim 11 wherein said computer program product is operable such that said borderline gateway comprises at least one of:
- an application programming interface (API);
- a virtual network function (VNF);
- a VNF instance; and
- a borderline network interface.

16. The computer program product according to claim 11 additionally comprising:
    computer code for changing said protective limit automatically, in real-time, according to at least one of load and consumption produced by said at least one external network entity.

17. The computer program product according to claim 11 additionally comprising:
    computer code for enabling a user to define at least one rule for calculating a value of said impact; and
    computer code for using said rule, by said borderline gateway, automatically, in real-time, to calculate said value of a possible impact of a current communication received by said borderline gateway.

18. The computer program product according to claim 11 additionally comprising:
    computer code for enabling a user to define at least one rule for determining a protection event; and
    computer code for using said rule, by said borderline gateway, automatically, in real-time, to determine id protection event associated with a current communication received by said borderline gateway.

19. The computer program product according to claim 11 additionally comprising:
    computer code for enabling a user to define at least one rule for handling a protection event; and
    computer code for using said rule, by said borderline gateway, automatically, in real-time, to limit said impact.

20. A system for limiting an impact of at least one internal network entity, on a network function virtualization (NFV) based communication network hosting said at least one internal network entity, said system comprising:
    a memory system; and
    one or more processing cores coupled to the memory system and that are each configured to:
    provide a container comprising at least one borderline gateway;
    provide within said container said at least internal network entity, wherein said internal network entity comprises at least one of;
        a software module;
        a virtual network function (VNF); and
        a VNF instance; and
        assign said borderline gateway at least one protective limit;
    wherein said NFV-based communication network comprises at least one external network entity, said external network entity is external to said container;
    wherein said at least one internal network entity communicates with any of said at least one external network entity only via said at least one borderline gateway; and
    wherein said borderline gateway is operative to use said protective limit to limit said impact on said NFV-based communication network.

* * * * *